Aug. 1, 1950

R. T. DEWEY 2,517,292

INSECT EXTERMINATOR

Filed May 26, 1947

Ray T. Dewey
INVENTOR,

BY
Bernard P. Miller
ATTORNEY

Aug. 1, 1950
R. T. DEWEY
2,517,292
INSECT EXTERMINATOR
Filed May 26, 1947
4 Sheets-Sheet 2
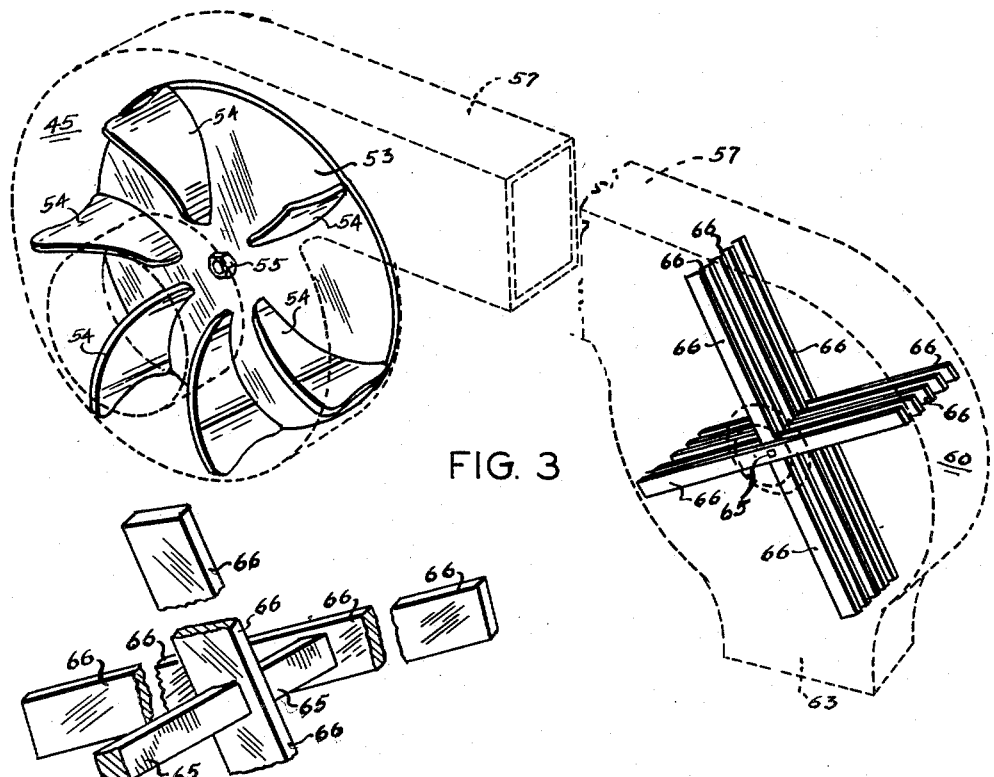
FIG. 3
FIG. 6
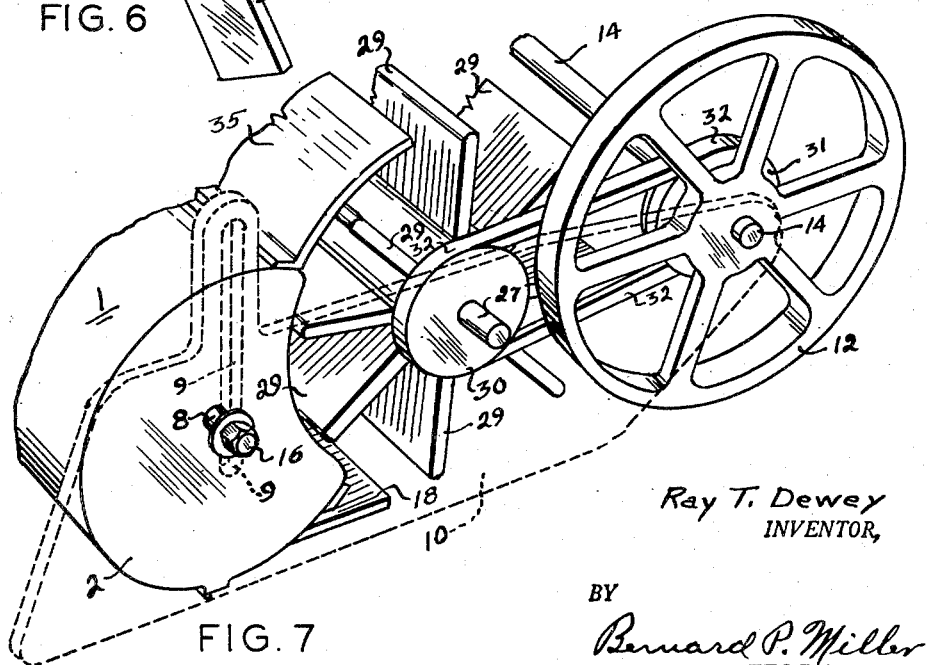
FIG. 7
Ray T. Dewey
INVENTOR,
BY
Bernard P. Miller
ATTORNEY Aug. 1, 1950 — R. T. DEWEY — 2,517,292
INSECT EXTERMINATOR
Filed May 26, 1947 — 4 Sheets-Sheet 3

Ray T. Dewey
INVENTOR,

BY Bernard P. Miller
ATTORNEY

Aug. 1, 1950            R. T. DEWEY            2,517,292

INSECT EXTERMINATOR

Filed May 26, 1947                                                  4 Sheets-Sheet 4

Ray T. Dewey
INVENTOR,

BY

Bernard P. Miller
ATTORNEY

Patented Aug. 1, 1950

2,517,292

UNITED STATES PATENT OFFICE 2,517,292

INSECT EXTERMINATOR

Ray T. Dewey, Watonga, Okla.

Application May 26, 1947, Serial No. 750,474

1 Claim. (Cl. 43—140)

The present invention relates to apparatus for removing insects from growing crops, and for destroying such insects.

The prime object of the invention is to provide a vehicle which may be drawn over a field of growing vegetation, and which will function to remove insects therefrom, and to destroy the same.

Another object is to provide apparatus for this purpose which will not damage the growing crop.

A further object is to provide a combination insect remover and exterminator which may be drawn by a usual farm tractor, and which is operatively powered by friction of its own wheels with the earth's surface.

In some climates and localities, various insects accord a serious problem to young growing field crops such as wheat, oats, alfalfa, etc. Poison spraying the fields does not exterminate some of such insects because of the fact that they suck the sap out of the plants, rather than eat the plant itself. One of this type of insect is commonly called the "Green Bug," and there are others which feed in a similar manner and cannot be poisoned by spraying. It is to combat such an insect, that the device of the present invention has been perfected.

It is therefore an object of the present invention, to provide an apparatus which will beat the insects off the plants, and thereafter will collect and kill them.

An additional object is to provide an apparatus, for the purposes set forth, which is simple and economical to operate, and which is efficient and durable.

Other objects will be apparent from the following description when taken in conjunction with the accompanying four sheets of drawings, wherein:

Figure 3 is a perspective view of the air impelling fan and the insect exterminating hammer mill mechanism, and diagrammatically illustrating their relation to each other;

Figure 6 is an enlarged fragmentary perspective view detailing the assembly of the beater arms on the beater shaft;

Figure 7 is a fragmentary perspective view of the insect collecting mechanism, which forms a part of the invention;

Like characters of reference designate like parts in those figures of the drawings in which they occur.

In the drawings:

Figure 1:
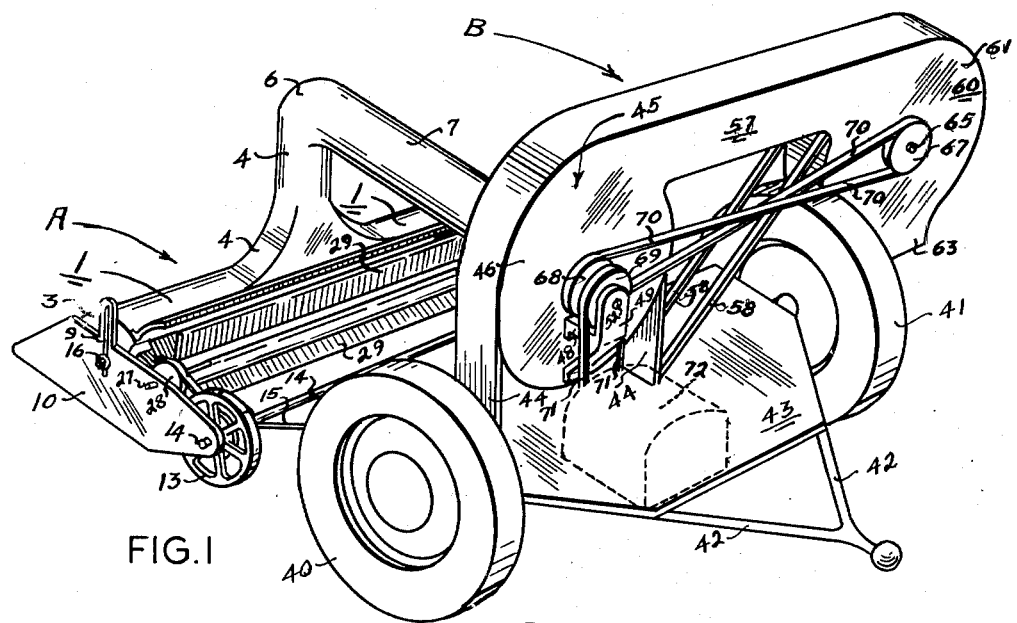
Figure 1 is a perspective view looking from a point in front and to the right hand of the apparatus.
Figure 2:
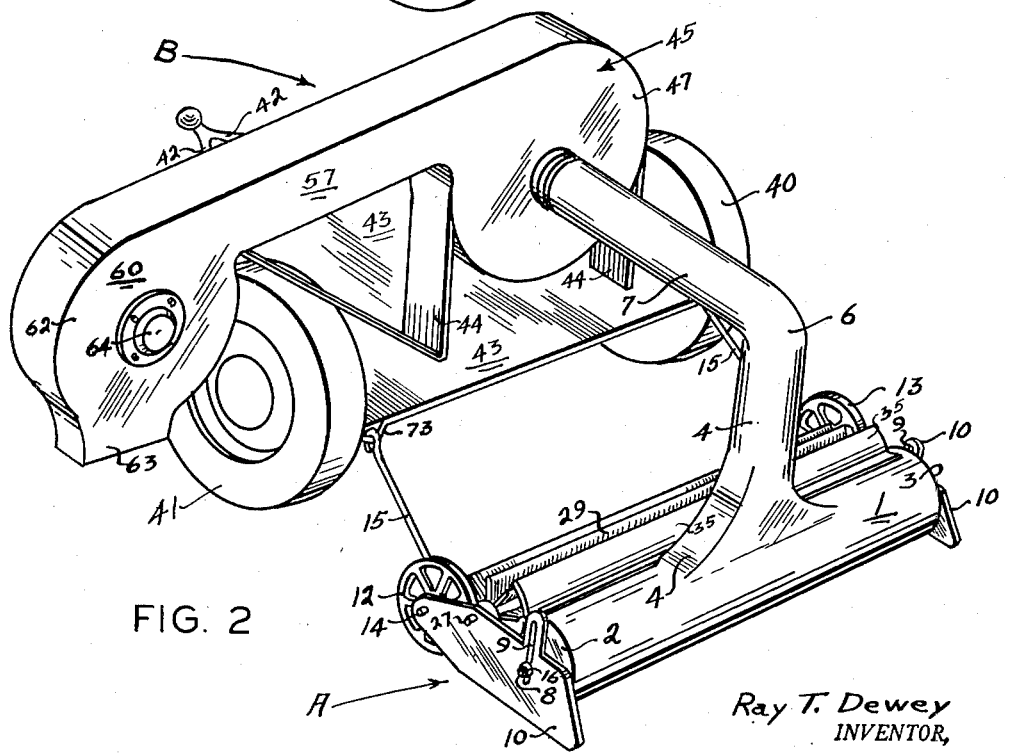
Figure 2 is a similar view looking from a point at the rear and to the left hand of the device.

The apparatus of the present invention includes two units of mechanism. The reference character A indicates, as a whole, the insect gathering or collecting unit, and B indicates, as a whole, the insect exterminating unit (Figs. 1 and 2).

The rotating parts in each unit are driven by the wheels which support that particular unit. However, there might well be instances in which it is found desirable to drive the units by an engine or motor.

Referring now more particularly to the construction of the gathering unit A, the reference numeral 1 indicates, as a whole, an elongated hollow tubular gathering chamber or hood preferably made of heavy sheet metal.

The chamber 1 has closed ends 2 and 3, and intermediate its ends, the chamber has an upwardly extending section of pipe 4 which communicates with the interior cavity or bore 5 of the chamber. The suction pipe 4 has an upper bend 6 from which a horizontal portion 7 extends to the unit B, as will be more fully described hereinbelow.

The ends 2 and 3 of the chamber 1 are each equipped with horizontally projecting axial trunnions 8, and each trunnion extends through a vertical slot 9 in a flat elongated supporting arm or plate 10, of which there are two, and which are identical. The slots 9 are located in the rear portions of each of the plates 10.

Figure 9:
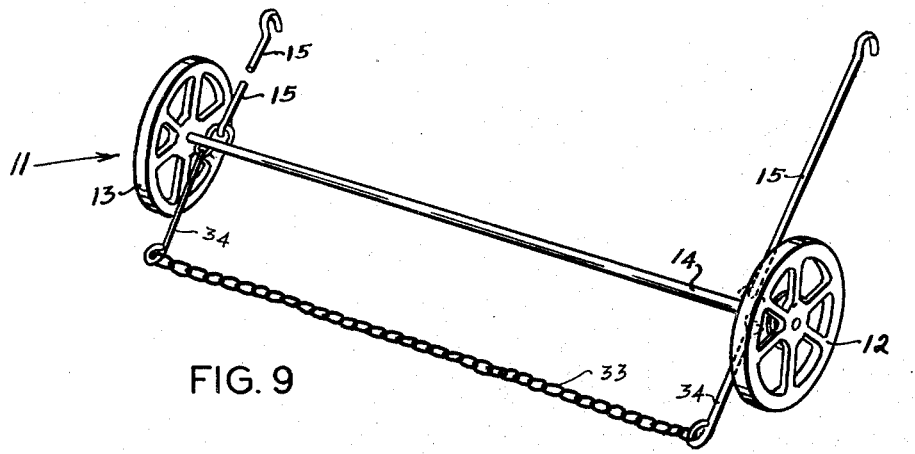
Figure 9 is a perspective view of a wheeled cart or carriage which operatively supports the insect collecting portion of the apparatus.

As a means for rollably supporting the chamber 1, and its accompanying mechanism, there is provided a wheeled truck or cart, best illustrated in Fig. 9, and indicated as a whole, by the numeral 11. The cart 11 is of simple construction, consisting only of two wheels 12 and 13 rotatably mounted upon opposite end portions of a horizontal shaft or axle 14. Two draw links or bars 15 have their rear ends pivotally engaged with the axle 14, and their forward ends are adapted to be connected to the unit B, as will be more fully described hereinbelow.

The axle 14 has its two ends projecting slightly beyond the wheels 12 and 13, and each projecting end portion passes through a perforation in the front portion of one of the plates 10. The plate 10 is rockable vertically upon the shaft 14, and may therefore be disposed at different desired angles with relation to the earth's surface. Locknuts 16 on the trunnions 8, act to hold the plates 10 in such desirably adjusted positions.

Figure 8:
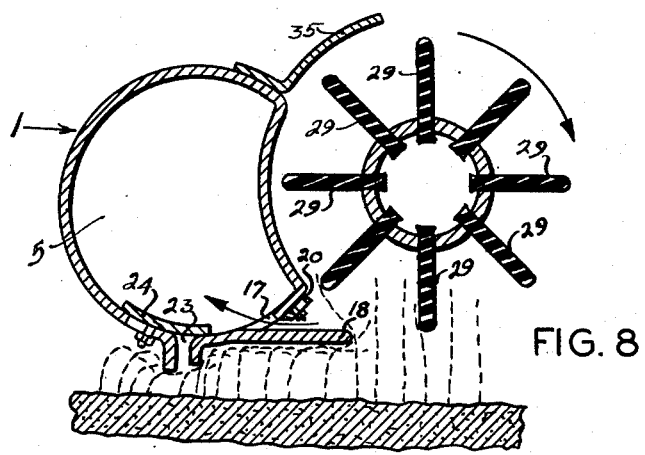
Figure 8 is a vertical sectional view taken transversely through the mechanism of Fig. 7.
Figure 11:
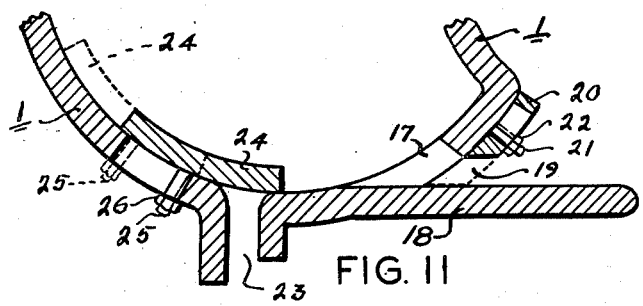
Figure 11 is an enlarged fragmentary vertical sectional view of the lower portion of the insect collecting manifold, and taken transversely through the same; and, Figure 12 is a schematic elevational view illustrating the path of air flow through the apparatus.
Figure 10:
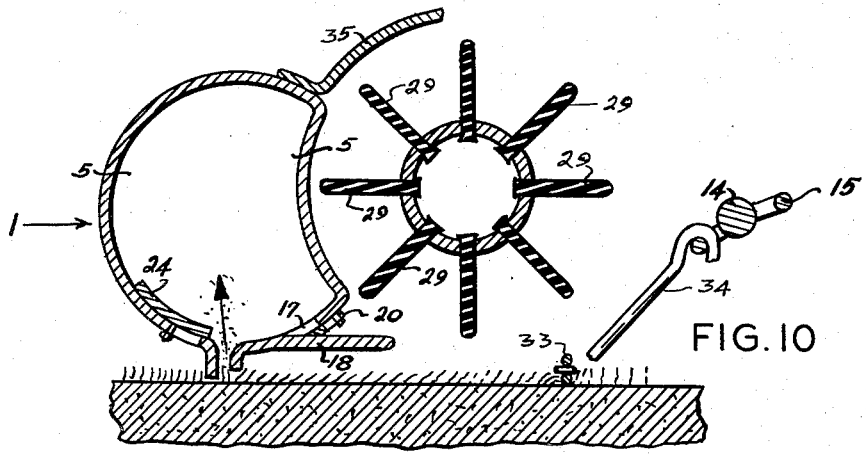
Figure 10 is a view similar to Fig. 8, and illustrating the use of a drag chain which is an optional portion of the apparatus.
Figure 12:
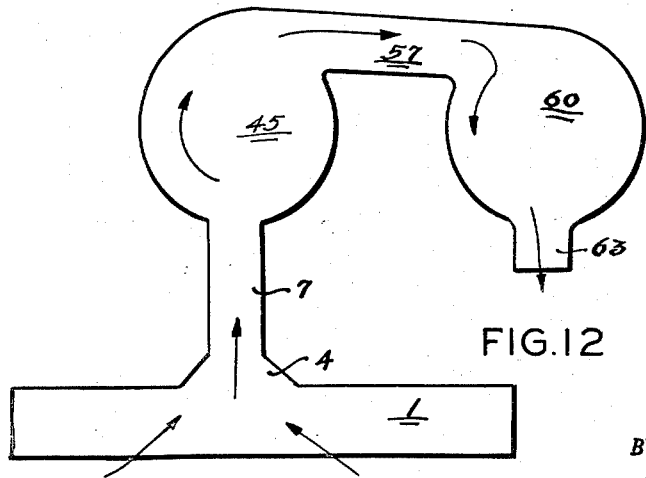

As best illustrated in Figs. 8, 10 and 11, the lower portion of the chamber 1 has an elongated opening or slot 17 which extends throughout the major portion of the length of the chamber. The slot 17 is partially closed by a horizontally mounted flat shoe 18 which extends along the chamber for the length of the slot 17. Above the shoe 18, there is left an inlet opening 19 which is actually a portion of the slot 17, and which is adapted to be either fully closed or partially opened by a vertically adjustable plate or damper 20. The damper 20 is vertically slidable upon pins 21 carried by the chamber 1, and clamping nuts 22 act to adjustably position the damper.

The forward edges of the shoe 18 forms with the chamber wall a vertically disposed inlet opening 23 which is actually a part of the slot 17, and this opening is adapted to be either closed or opened by a second damper plate 24 mounted on the inside surface of the chamber wall. Pins 25 and clamping nuts 26 act to hold the plate 24 in desired positions of adjustability.

Journalled for rotation in the two plates 10, and lying between the chamber 1 and the axle 14, there is provided a horizontal shaft 27. Rigidly mounted on the shaft 27 is a cylindrical drum 28 having radially projecting vanes or paddles 29. The shaft 27, drum 28, and paddles 29 constitute a paddle wheel which is adapted to rotate immediately in front of the openings 19 and 23 of the hood 1. Rotation of the paddle wheel acts to contact and beat the salks of growing crop, in order to brush or jar insects therefrom.

Some of the insects are throw into the path of air entering the hood through the opening 19, while those insects which fall upon the the ground, are sucked into the hood by air entering the opening 23.

As a means for driving the paddle wheel, a suitable pulley 30 is mounted on one end of the shaft 27 just inside of the plate 10 (Fig. 7), and the wheel 12 has an enlarged inside hub extension which forms a driving pulley 31. An endless belt 32 drivably envelopes both pulleys 30 and 31 so that the paddle wheel is forcibly rotated by rotation of the wheel 12.

In some instances it may be found desirable to operate the device over a field in which the crop is too short to be contacted by the paddle wheel. In such cases, a drag chain or cable 33 may be carried by the draw bars 15 or by links 34 connected to the axle 14, so that the crop will be violently agitated in front of the hood 1 (Figs. 9 and 10).

The upper rear portion of the paddle wheel may be partially covered by an arcuate shield 35 mounted on the hood 1, if desired.

The mechanism thus far described hereinabove, and the various parts of which are indicated by the reference numerals 1 to 35 inclusive, constitutes the insect gathering or collecting unit A of the invention. The exterminating or insect disposal unit B will next be described hereinbelow, attention being particularly directed to Figs. 1, 2, 3, 4, 5, and 6 of the drawings.

In those figures of the drawings:

The reference numerals 40 and 41 indicate, respectively, right and left hand wheels which are adapted to roll upon the earth's surface, and to support the unit B, through action of a usual horizontal axle, not shown, but to which the two wheels are keyed. The rear ends of two forwardly converging draw-bars 42 are connected to said axle, so that the entire device may be drawn by a team of horses or by a tractor. The axle and the rear portions of the draw-bars 42 are covered by a sheet metal floor 43 which is welded or otherwise rigidly connected to the draw-bars.

Rigidly mounted upon the floor 43, and supported thereabove on legs 44, is a hollow cylindrical fan housing 45, having both of its ends closed. The front and rear ends of the housing 45 are respectively indicated by the reference numerals 46 and 47. The rear end 47 of the fan housing 45 is equipped with a central orifice, within which the front end of the horizontal portion 7 of the suction pipe 4 is connected.

Figure 4:
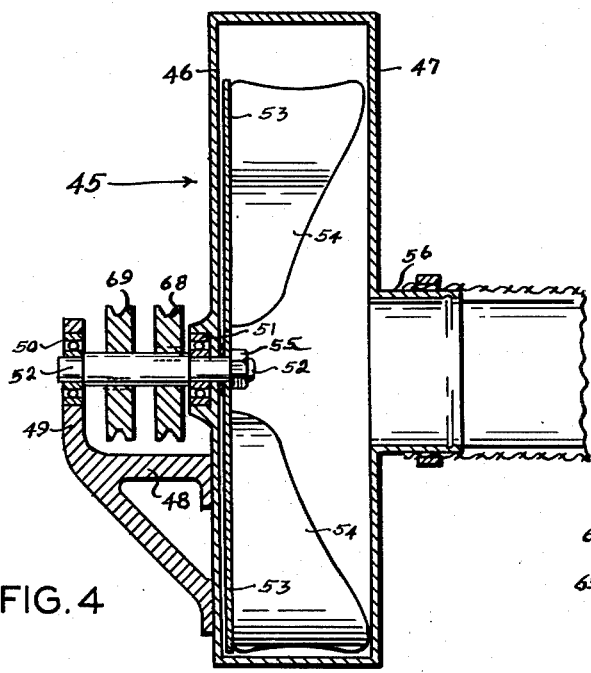
Figure 4 is a vertical sectional view through the fan housing, and illustrating the fan and its mounting mechanism.

As best illustrated in Figs. 1 and 4, the front end 46 of the housing 45 is equipped with a rigidly mounted forwardly projecting bracket 48, having an upstanding end 49 which carries a frictionless bearing 50. The housing end 46 also has a frictionless bearing 51 mounted therein, and the two bearings journal a fan shaft 52.

Within the housing 45, and adjacent the inside surface of the front wall 46 thereof, and rigidly keyed or otherwise attached to the inner end of the shaft 52, there is provided a flat plate or disc 53. Rigidly mounted on the inner face of the disc 53, is a plurality of suitable vanes or fan blades 54 which project laterally toward the rear end of the housing, and which radiate outwardly from the shaft 52. The fan blades 54 may be of any suitable type for impelling air when the shaft 52 and disc 53 are rapidly rotated. A suitable nut 55 is provided on the inner end of the shaft 52 for holding the disc 53 in place.

The housing 45 has an axial inlet opening in its rear wall 47, and a nipple 56 or other suitable means is provided for connection to the horizontal portion 7 of the pipe 4 of the unit B. The upper portion of the housing 45 opens into a hollow horizontal conveyor pipe 57 which is adapted to carry off air from the housing. Of course, the conveyor pipe 57 also conveys any foreign matter which might be entrained in the air. Suitable braces 58 are provided for rigidly supporting the conveyor 57 above the floor 43.

The conveyor pipe 57 leads to a hollow cylindrical hammer mill housing 60 which has both of its ends closed. The front end of the mill housing 60 is indicated by the reference numeral 61, and its rear end by the numeral 62. The housing 60 has a downwardly extending open outlet spout 63 adapted to discharge air and air entrained matter on to the earth's surface at one side of the vehicle.

The two end walls 61 and 62 of the housing 60 have axially located frictionless bearings 64 which journal for rotation a horizontal shaft 65. That portion of the shaft 65 which resides between the bearings 64, is made polygonal in cross section. This polygonal portion of the shaft is completely covered by an assembly of elongated strap metal hammers 66 which have central openings registering with and closely enveloping the polygonal portion of the shaft.

Each alternate one of the hammers 66 is disposed at ninety degrees from the next adjacent hammer (Fig. 3), and the hammers substantially fill the transverse extent of the space within the housing 6. It is thought to be obvious that when the shaft 65 and hammers 66 are in rapid rotation, they will substantially sweep the entire space within the housing 60. The hammers 66 and the shaft 65 constitute a hammer mill which is adapted to beat and kill any insects which may be entrained in the air which enters the housing 60.

Figure 5:
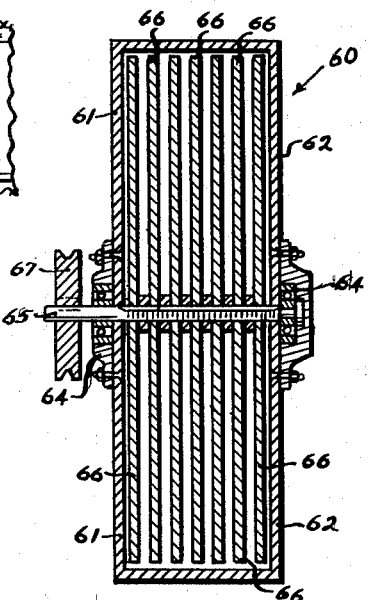
Figure 5 is a vertical sectional view through the housing of the exterminating hammer mill, and illustrating its drive and its mounting mechanism.

As a means for driving the shaft 65 to rotation, the forward end of the shaft projects a suitable distance through the front bearing 64, and to this projecting end portion of the shaft is keyed, or otherwise rigidly mounted, a pulley 67 (Figs. 1 and 5).

That portion of the fan shaft 52 which resides between the bearings 50 and 51 of the fan housing 45, is equipped with an inner pulley 68 and an outer pulley 69, both of which are keyed to the shaft. An endless belt 70 envelopes the pulleys 68 and 67 to cause simultaneous rotation of both, when the shaft 52 is rotated.

The shaft 52 is adapted to be driven to rotation through the office of an endless belt 71 traveling over the outer pulley 69. The belt 71 is driven from any suitable belt and pulley train, or conventional gear train, not shown, but located within a housing 72 on the floor 43 (Fig. 1). This gear train can be driven either by a power take-off from a tractor, or by an individual power unit carried by the unit B.

The rear portion of the floor 43 is provided with eyes or other connecting means 73, whereby the draw-bars 15 may be connected to the unit B, so that the unit A will trail the same.

In operation, when the vehicle is being drawn over a field of growing crop, the fan, the hammer mill and the paddle wheel are all driven to rotation.

Forward motion of the vehicle causes either the paddle wheel or the chain 33 to dislodge insects from the crop.

The suction of the fan creates a suction at the openings 19 and 23 of the hood 1, and the insects are drawn therethrough into the hood. Air suction further draws the insects entrained in the air, upwardly through the pipe 4, and horizontally through the pipe portion 7 into the fan housing 45. The insects pass through the fan and are blown through the horizontal conveyor 57 into the hammer mill housing 60.

The insects are driven at a comparatively high velocity into the path of the rotating hammer blades 66, and the insects are killed by violent contact therewith. The dead insects are then blown out of the discharge spout 63 at one side of the path in which the vehicle is traveling.

Draft through the inlet openings 19 and 23 of the hood 1 may be regulated by selectively setting the damper plates 20 and 24.

The hood 1 may be selectively raised or lowered with relation to the earth's surface, by the proper setting of the two locknuts 16 on the trunnions 8.

Obviously the invention is susceptible to some change or alteration without defeating its practicability, and I therefore do not wish to be confined to the preferred embodiment shown in the drawings and described herein, further than I am limited by the scope of the appended claim.

I claim:

In an insect exterminating apparatus: a first wheeled vehicle unit adapted to be drawn over a field of growing crop comprising a beater-mill having a discharge to the ground; a housed rotary fan having its discharge in communication with the mill; a second wheeled vehicle unit adapted to be drawn behind the first unit comprising a collector hood carried by the second unit and having an elongated opening presented to the crop; a sliding closure for said opening; a duct leading from the hood to the suction side of said fan; and a rotatable beater carried by the second unit for dislodging insects from the crop in front of said opening.

RAY T. DEWEY.

REFERENCES CITED

The following references are of record in the file of this patent:

UNITED STATES PATENTS

| Number | Name | Date |
| --- | --- | --- |
| 229,390 | Dunning | June 29, 1880 |
| 1,431,108 | Fenley | Oct. 3, 1922 |
| 1,457,420 | Bender | June 5, 1923 |
| 1,464,799 | Anderson | Aug. 14, 1923 |
| 1,989,405 | Dillman | Jan. 29, 1935 |
| 2,374,150 | Williams | Apr. 17, 1945 |